Figure 3:
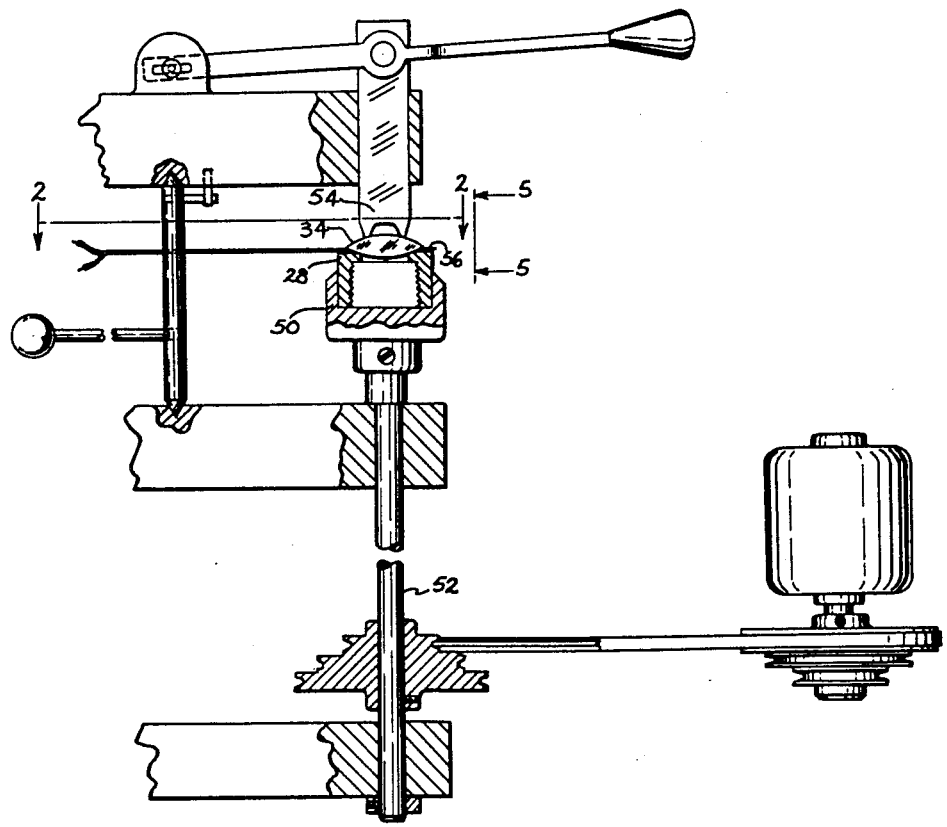

Jan. 5, 1960   A. M. BERGMANN   2,919,626
PROCESS OF MOUNTING LENSES
Filed Oct. 28, 1957   3 Sheets-Sheet 1
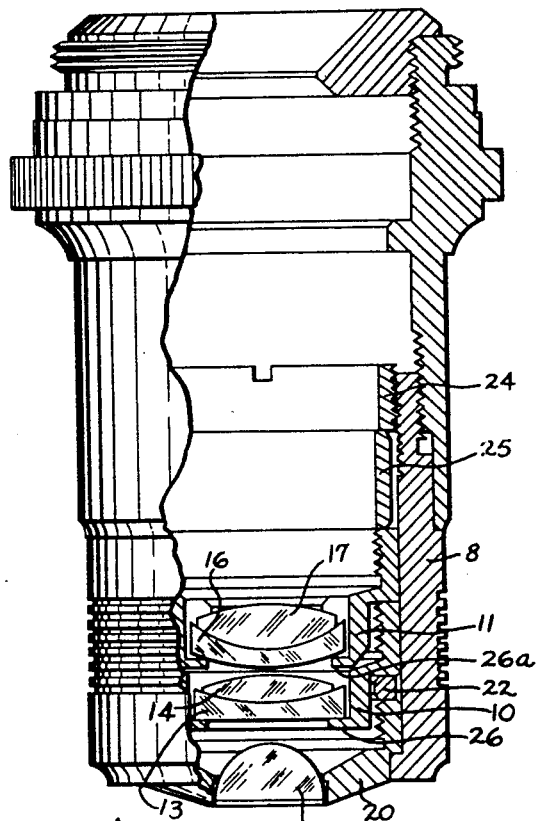
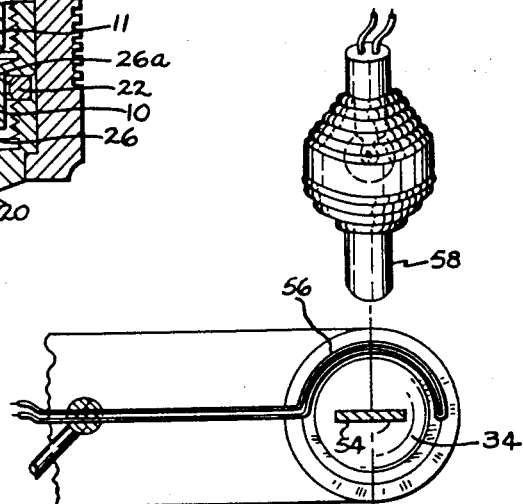
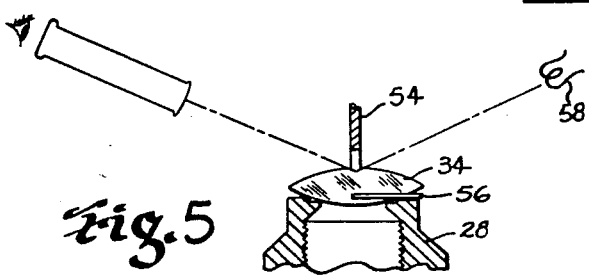
INVENTOR
ANDREW M. BERGMANN
BY
Herbert C. Kimball
ATTORNEY

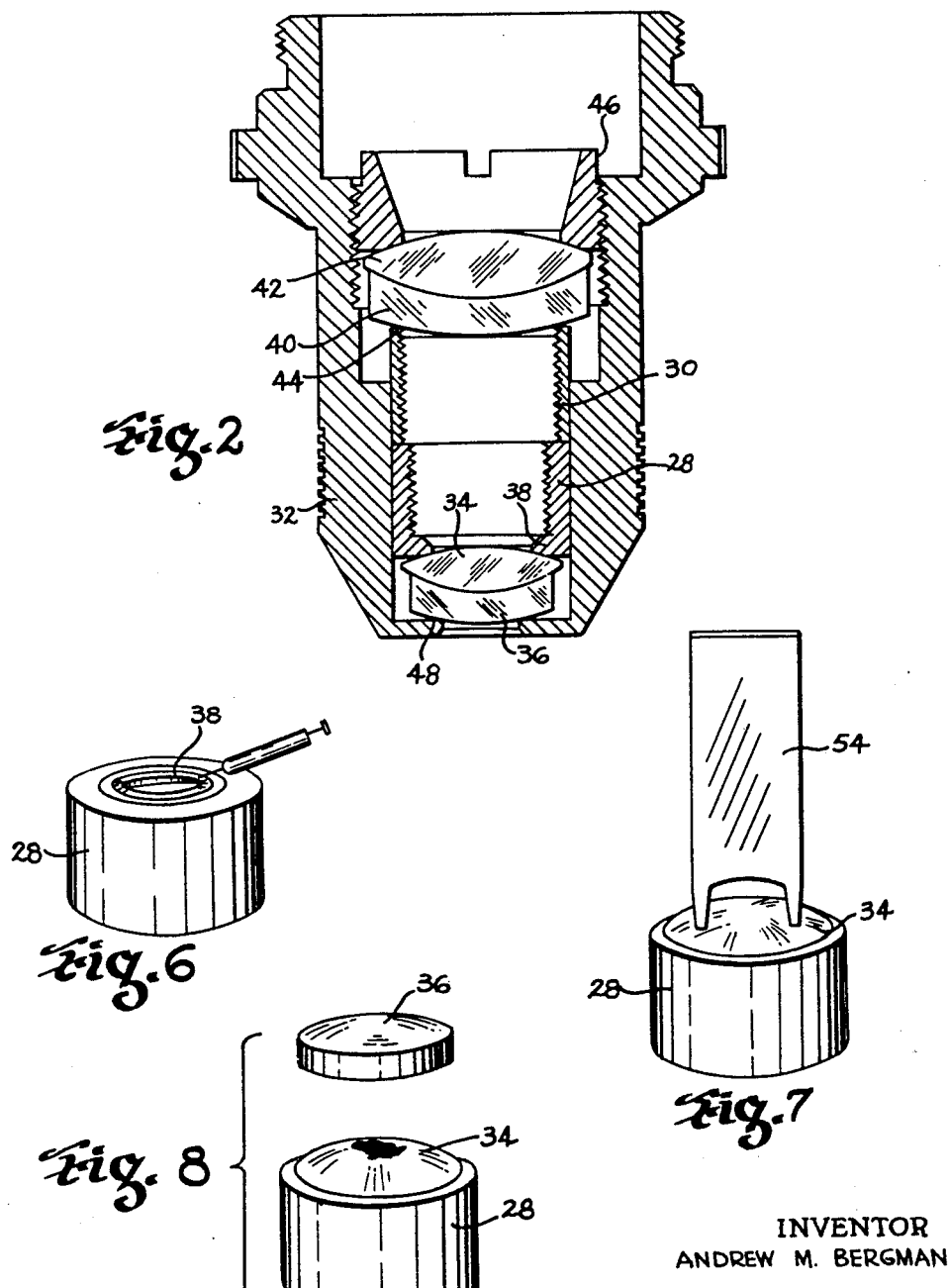

United States Patent Office 2,919,626
Patented Jan. 5, 1960

2,919,626

PROCESS OF MOUNTING LENSES

Andrew M. Bergmann, Buffalo, N.Y., assignor to American Optical Company, Southbridge, Mass., a voluntary association of Massachusetts Application October 28, 1957, Serial No. 692,648

3 Claims. (Cl. 88—57)

This invention relates to an improved method of assembling the elements of a compound lens, such as a microscope objective, in its mounting.

In the past it has been customary to depend upon accurate edging of a doublet for accurate centering of the doublet in its mount. For instance, a flint element is cemented to a crown element to form a doublet, and then an attempt is made to accurately grind the edge of the doublet concentric with its optical axis. If the result is not entirely satisfactory, an attempt may be made to position the doublet slightly eccentrically in its mount; but this is quite likely to result in strain in the lenses. Moreover, even though the edging is performed with sufficient accuracy, it is customary to form the mount initially with a slightly under-size bore; and a reaming operation must accordingly be performed in order that the doublet may have a sufficiently snug fit in the bore to prevent accidental displacemnt. These fitting operations are costly and time consuming.

It has been common knowledge that if a spherical surface of a lens is brought in contact with a seat in the form of an edge which is a true circle, the lens may be centered on this circular edge by what is known as the stick method. A flat piece of hard wood with one or more prongs is lowered against the upper face of a lens resting on the above mentioned circular edge, and if the cell carrying the lens is rotated and the prong or prongs of the stick pressed against the lens, the latter will adjust its position on the circular edge. This adjusting is continued, observing the two images reflected from the two surfaces of the lens, until these images are motionless, i.e. until the optical axis of the lens coincides with the axis of symmetry of the mounting, regardless of the state of the edges of the lens.

It is an object of the present invention to employ this principle and technique in a new method of attaching the elements of a compound lens in assembled relation to a lens cell, without preliminary edging of the elements. In this way, the critical alignment of the optical axes of the elements of the compound lens with the axis of the cell is accomplished as the elements are attached to the cell. The cell may then be mounted in the boot of an objective or in the desired optical system. Since accuracy of machining of the cell and of the boot or other mount is much more readily obtained than accuracy in edging the glass of the lens elements, this new method has marked advantages over the assembling of lens elements which are edged to determine the optical axis of the compound lens.

I have shown in Fig. 1 a 4 millimeter achromatic objective having two doublets whose elements have been mounted in accordance with my improved method. I have shown in Fig. 2 a 16 millimeter achromatic objective whose elements have been mounted in accordance with my improved method. Fig. 3 is a diagrammatic view principally in central vertical section illustrating the centering of one lens of a doublet on a cell which can later be mounted in the boot of an objective or the like. Fig. 4 is a plan view illustrating how a spot of light is directed on the element being centered. Fig. 5 is a side view illustrating how the reflection of the spot of light is seen by the operator. Figs. 6, 7 and 8 show diagrammatically to an enlarged scale three stages of the process, Fig. 6 showing adhesive deposited on the circular edge of a cell, Fig. 7 showing a lens element being centered on the seat, and Fig. 8 showing the depositing of further adhesive on the upper surface of the element ready to receive the second element.

Figure 1 of the drawing shows by way of example an achromatic objective having two doublets behind a hemispherical front lens. Each of the doublets is carried by a cell which in turn is set snugly within the boot 8 of the objective mount. The cells 10 and 11 are substantially alike, the flint element 13 and the crown element 14 of the front doublet being mounted in the cell 10, and the flint element 16 and the crown element 17 of the rear doublet being mounted in the cell 11. The hemispherical element 19 may be fitted into its cell 20 by a conventional process which is well known and need not be described here. A spacer 22 whose thickness may be varied determines the separation between the lens 19 and the front doublet. A threaded ring 24 engages a spacer 25 which in turn engages the cell 11 to retain the cells 20, 10 and 11 in the boot 8. It will be noted that each of the cells 10 and 11 has a front flange 26 or 26a which is accurately machined with an axis of symmetry which coincides with the bore of the boot 8.

Figure 2 shows a longer focus objective which is made up of two doublets whose cells 28 and 30 are inserted back to back in the boot 32 of the objective mount. The crown element 34 is cemented on a flange 38 on the cell 28. and the flint element 36 is united by cement to the element 34 thus forming the front doublet. In similar fashion the flint element 40 is secured on a seat 44 on the cell 30, and the crown element 42 is united by cement to the flint element 40 this forming the rear doublet. A retaining ring 46 is threaded into the objective mount to urge the doublets mounted on their respective cells toward each other. At the same time the pressure generated by the ring 46 pushes the element 36 against a retaining flange 48 at the front of the boot 32.

It will be readily apparent from the ensuing description that substantially the same method may be used for mounting each of the foregoing doublets in or on its cell; and accordingly the assembling of only one doublet with its cell will be described. Taking cell 28 as an example, a restricted amount of adhesive is evenly distributed about the annular top surface of the flange 38 which becomes the seat for the doublet. This operation is illustrated diagrammatically in Fig. 6.

The type of adhesive used is important to the success of the assembly process. At the time the element 34 is being centered on the seat, the hold of the cement on the element should not be so tenacious as to prevent a ready shifting of the element as its axis is aligned with the axis of the cell 28. On the other hand the cement should become firm enough by the time the second element of the doublet is added so that the second centering operation does not disturb the alignment of the first element. I have found that an adhesive with controllable viscosity is suitable for this purpose; and I control the viscosity so that while the element is being centered the viscosity of the cement is low enough to permit shifting of the lens on its seat. Later the cement is rendered rigid by simple passage of time or by polymerization or in othes suitable fashion.

I prefer to use a cement with a methacrylate base and to accelerate the polymerization of the cement between the stages of the process to speed up the firming of the cement. A cement of this methacrylate type is sold by Eastman-Kodak Company of Rochester, New York, as brand HE—S1. Cements of the methacrylate type adhere tenaciously to glass, and at the same time are very resistant to fracture. I at times use a shellac cement which is inferior in the above properties, but which has the very desirable property that it may readily be cleaned from glass surfaces. A shellac cement can be cut with alcohol to render it as fluid as desired. The evaporation of the alcohol and other solvents firms the cement, and when heat-treated the shellac polymerizes to a rigid and somewhat brittle state. As above mentioned, this cement is more readily cleansed by means of alcohol from glass surfaces than is a methacrylate type of cement. A cement of the shellac type is sold under the brand name De Khotinsky.

With the adhesive on the seat 38 of the cell 28, the cleaned element 34 is placed on the seat and the cell inserted in the chuck 50 of a motor-driven spindle 52 which is free of eccentric motion. It is customary to arrange such spindles on a vertical axis as illustrated in Fig. 3 and to lower the forked stick 54 against the top surface of the lens element 34. The prongs of the stick 54 through continued use soon come to be related to the spindle 52 so that both prongs are in contact with the upper surface of the element 34 when it is properly centered. The prongs pressing on the top surface of element 34 will center it on the flange 38, assuming that the adhesive is not too firm.

A heating coil 56 (Fig. 4) is pivotally mounted adjacent the spindle 52 so that it may be swung into partially encircling relation with the lens element 34 as it rotates with the spindle 52. If the electric current is now supplied to the coil 56, the cement is rendered more fluid by heat, so that the element 34 is relatively free to adjust its position on the flange 38, in response to the pressure of the stick 54.

To determine whether accurate centering has been accomplished, a spot light is directed downwardly at an angle on the element 34 from the illuminator 58, as shown diagrammatically in Fig. 5. Two reflections of the light spot will be observed by the inspector, one reflected from the upper surface and the other from the lower surface of the element 34. The reflection from the lower surface will run true only if the axis of symmetry of the cell is accurate. Some dirt beneath the cell may likewise throw it off in the chuck 50. When neither spot wavers during rotation of the spindle 52, the axis of the element 34 is properly aligned with the axis of the cell 28; and the heating coil 56 can be swung back and the cell 28 and element 34 prepared for the next stage. Generally it will be of advantage to subject the adhesive holding the element 34 to the flange 38 to ultra-violet light for a sufficient period of time to firm the cement, lest accidental displacement of the element 34 take place. This discussion has referred to a crown element, but it is obviously of no concern whether the lens designer decides to put a flint element or some other element against the seat of the cell, and equally of no concern whether the lens designer puts a flat, a concave, or a convex surface next to the seat of the cell, as the process will work equally well with any of these arrangements.

A restricted amount of cement is now placed on the exposed surface of the element 34 (see Fig. 8) and a cleaned element 36 is placed against this surface. After working out any entrapped air bubbles from the cement, the operator partially polymerizes the cement to stiffen it, and then places the cell 28 in the chuck 50 of the same or of an additional spindle and the process of centering by applying pressure with the stick 54 is repeated. This time three reflections of the light spot will appear; but if the previous centering has been properly done, only the reflection from the top surface of element 36 need be scrutinized. When the two lens elements of the doublet are properly centered, none of the three reflections will waver, the pressure of the stick 54 being brought to bear until there is no wavering of the reflection from the top surface of the top element.

As above mentioned, the condition at this time of the cement attaching the element 34 to the flange 38 is important. While the methacrylate cement referred to will in any event gradually become rigid (polymerize) at room temperature, such ageing is in general too slow. What is desirable is a faster firming of the first cement to make the seating of the first element secure before attempting to add the second. The treatment with ultra-violet light above referred to hastens the firming of the first cement so as to retain the first element undisturbed on its seat while the second element is being attached to the first. The second cement (which is shown in Fig. 8), when squeezed so as to spread over the interface, is subjected to heat from the heating coil 56; and centering is accomplished by pressing against the top surface of the second element with the stick 54. Therefore it is undesirable to have the first cement as readily softenable by heat at this time as is the second cement.

In the case of a shellac base cement, the evaporation of the alcohol or other solvent renders the first cement more viscous so that the centering of the second element can be accomplished without disturbing the centering of the first.

After both elements have been centered in the manner above described, the assembly is ready to be inserted in the microscope boot 8. In the case of a methacrylate cement, treatment with ultra-violet light will hasten the setting of the cement in the interface as well as the cement on flange 38.

The improved process has been described as applied to a doublet mounted on a cell of the form of cell 28 having a seat 38. The improved process is equally applicable to the mounting of a doublet in a cell such as shown in Fig. 1 at 10 or 11. The first element is affixed by cement in the above manner to the seat on flange 26 or 26a and the second element is united by cement to the first element according to the foregoing teachings. A flat surface such as is found on the front of element 13 is a special case, but one familiar to those skilled in this art. The flat surface slides laterally without tilt on the circular flange 26. It is the top (concave) surface which must be centered, and when the reflection of the light spot 58 no longer wavers, the operator knows that the pressure of the stick 54 has brought the optical axis of the element 13 into alignment with the axis of symmetry of the cell 10.

My improved procedure has many advantages. By eliminating the edging of the cemented doublets, considerable saving is effected in the cost of manufacture of quality objectives. Moreover, the centering of the lens elements may be checked at each stage in the assembling process, and rejections are less costly than in prior processes which depend upon the inspection of the finished product after the doublet has been fitted to its cell.

A very important advantage of my invention, in addition to the lowering of costs, is the substantial increase in the yield of "strain-free" objectives Such "strain-free" objectives give better performance, and indeed are essential for certain research work.

I claim:

1. A method of assembling optical objectives consisting in applying a polymerizable cement to a circular seat on a support of said objective, placing a first lens element on the cement on said seat, aligning the optical axis of said lens element with the axis of symmetry of said seat by rotating said seat about its axis of symmetry and applying pressure on the exposed face of said element while observing the reflection of a light spot from said face, polymerizing said cement to secure said lens element on said seat, applying cement on the exposed face of said lens element, placing a second lens element on the cement on said exposed face, aligning the optical axes of said lens elements by rotating said seat and lens elements about the axis of symmetry of said seat and applying pressure on the exposed face of said second lens element while observing the reflection of a light spot from the exposed face of said second lens element, and firming said cement in the interface between said lens elements to secure said elements together with their optical axes in alignment.

2. A method of assembling a plurality of lens elements of an optical objective with a support of said objective having a circular seat consisting in depositing a polymerizable cement on said seat, supporting a first lens element on the cement on said seat, rotating said support about the axis of symmetry of said seat and applying pressure on the exposed face of said lens element to shift said element on said seat while observing the reflection of a light spot from said face to align the optical axis of the lens element with the axis of symmetry of said seat, and after the said cement has polymerized to become more tenacious applying cement on the exposed surface of the first lens element, supporting a second lens element on the cement on said exposed surface, again rotating said support and applying pressure on the exposed face of said second lens element to shift said second lens element relative to the first while observing the reflection of a light spot from said face of said second element to align the optical axis of the second lens element with the optical axis of the first lens element, and firming said cement in the interface between said lens elements to secure said elements together with their optical axes in alignment.

3. A method of assembling a plurality of lens elements of an optical objective with a support of said objective having a circular seat consisting in depositing a heat-softenable cement on said seat, supporting a lens element on the cement on said seat, heating said cement while rotating said support about the axis of symmetry of said seat and applying pressure on the exposed face of said lens element to shift said element on said seat while observing the reflection of a light spot from said face to align the optical axis of the lens element with the axis of symmetry of said seat, after the first cement has cooled and become more tenacious applying cement on the exposed surface of said lens element, applying a second lens element to the cement on said exposed surface, heating said second cement while rotating said support about the axis of symmetry of said seat and applying pressure on the exposed face of said lens element to shift said second element on the first element while observing the reflection of a light spot from said face to align the optical axes of the two elements, and firming said cement in the interface between said lens elements to secure said elements together with their optical axes in alignment.

References Cited in the file of this patent

UNITED STATES PATENTS

| | | |
|---|---|---|
| 1,722,520 | Glancy | July 30, 1929 |
| 2,042,565 | Tillyer | June 2, 1936 |
| 2,240,827 | Bangert et al. | May 6, 1941 |
| 2,259,006 | Simmons | Oct. 14, 1941 |
| 2,394,721 | Simmons et al. | Feb. 12, 1946 |
| 2,580,507 | Bernheim et al. | Jan. 1, 1952 |